United States Patent [19]

Kitzmiller

[11] Patent Number: 4,514,914
[45] Date of Patent: May 7, 1985

[54] SOLAR CLOTHES DRYER

[76] Inventor: George R. Kitzmiller, 721 E. 5th St., Hialeah, Fla. 33010

[21] Appl. No.: 580,817

[22] Filed: Feb. 16, 1984

[51] Int. Cl.³ .......................... F24J 3/02; F24B 19/00
[52] U.S. Cl. ..................................... 34/93; 126/435; 126/437
[58] Field of Search .................... 34/86, 93, 92; 126/428–432, 435, 450, 437

[56] References Cited

U.S. PATENT DOCUMENTS

| | | | |
|---|---|---|---|
| 3,902,474 | 9/1975 | Pyle | 126/429 |
| 4,067,314 | 1/1978 | Bollefer | 126/435 |
| 4,122,828 | 10/1978 | Diperi | 34/93 |
| 4,125,946 | 11/1978 | Prager | 34/93 |
| 4,203,422 | 5/1980 | Bottum | 126/435 |
| 4,279,082 | 7/1981 | Commander | 34/93 |

FOREIGN PATENT DOCUMENTS 49640  4/1979  Japan .................................. 126/435

Primary Examiner—James C. Yeung
Attorney, Agent, or Firm—John Cyril Malloy

[57] ABSTRACT

A clothes drying assembly of the type primarily designed to include a casing, preferably a conventional tumbler type casing, disposed in communication with heated air passing over and in heat transferring relation with a heat transferring coil having heated fluid continuously flowing therethrough from a solar energy type heat collector disposed in direct exposure to the sun's radient energy. Structure is provided to selectively discontinue use of the solar heating facility and dry clothes within the casing by conventional electrical or like heating equipment.

14 Claims, 5 Drawing Figures

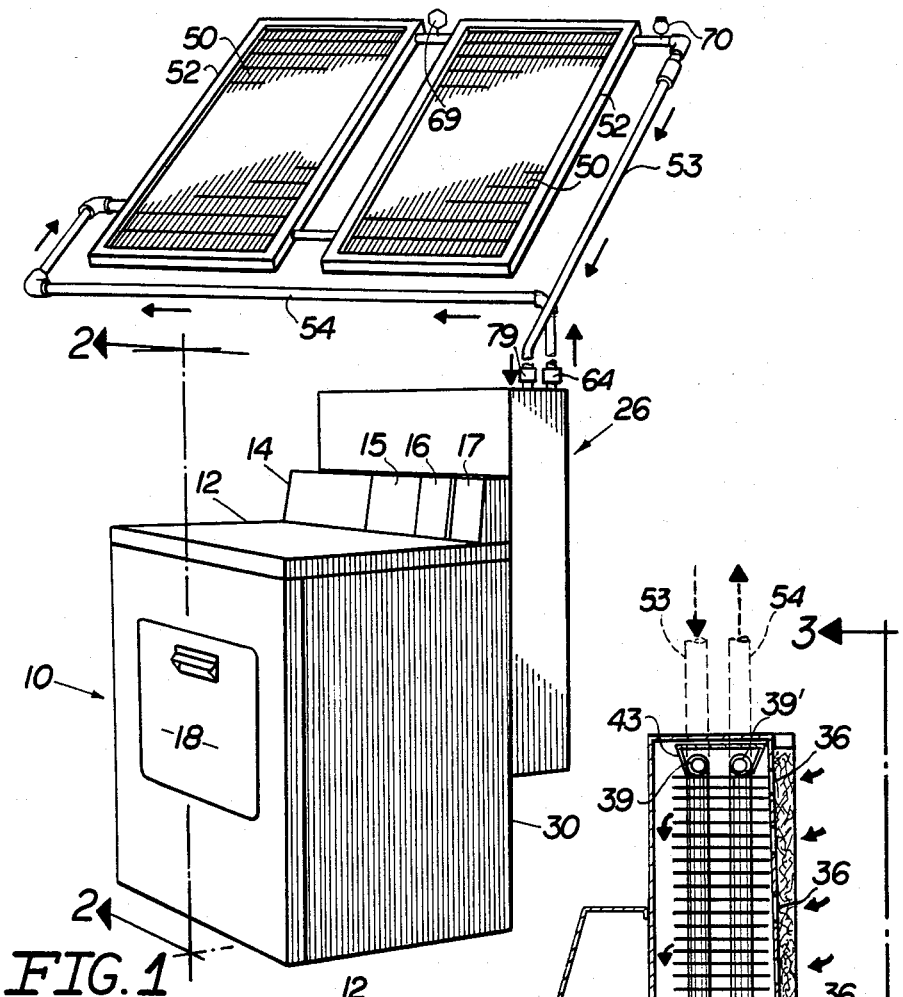

SOLAR CLOTHES DRYER

BACKGROUND OF THE INVENTION

1. Field of the Invention

A clothes drying machine modified or initially structured to force heated, drying air into a tumbler or like structured casing by passing the air over a heat transferring coil through which solar heated fluid continuously and/or selectively flows.

2. Description of the Prior Art

With the expense and relative scarcity of fossil fuels, energy costs have risen sharply thereby necessitating conservation of energy in many ways not previously thought important. In the average residential dwelling attempts have been made to lessen the amount of electricity utilized through the installation of various solar energy producing devices. Common among these are the solar collector plates which are particularly structured for the production of heated water and steam and are even incorporated into structures for the production of electricity.

However, modern technology has not yet perfected such solar heating devices and/or the storage of heated water to the extent where the entire household can be efficiently operated without the need for conventional and/or auxiliary forms of energy. Modern day technology, in the solar energy field, has advanced to the point where large amounts of heated water and/or heated fluid can be produced such that certain specific applications are efficient to the extent of saving great quantities of energy and thereby significantly lowering the energy costs for a given residential dwelling.

Such application of the use of solar collector plates are not limited solely to the production of washing and/or drinking water but may be used with other residential appliances such as clothes dryers or the like. Existing United States patents disclosing such appliances initially designed or otherwise structurally modified for the adaptation of solar energy include the patents to Hastings, U.S. Pat. No. 4,236,322; Prager, U.S. Pat. No. 4,125,946 and Commander, U.S. Pat. No. 4,279,082.

While operable for the applications indicated, there is obviously room for improvement in the area of clothes drying assemblies or appliances incorporating the use of solar energy for the production of heated air which is channelled to a tumbler or other type casing in which the actual drying process takes place.

SUMMARY OF THE INVENTION

The present invention is directed towards a solar drying assembly and more specifically a housing incorporating a tumbler type casing common to substantially conventional clothes drying appliances found in residential dwellings.

An air flow casing is mounted on the regular dryer housing and includes a heat transfer coil means mounted and at least partially enclosed therein. Further, a blower or air driving means is disposed to establish, when activated, a path of air flow through the air flow casing and in heat transferring relation to heat transfer coil means. Air entering the casing is heated to a temperature or degree sufficient to dry clothes disposed in the tumbler casing when such heated air is exposed thereto.

A path of heated fluid flow is defined by the heat transfer coil means as well as heat absorbing coil means, the latter located in heat collector plates, which may be of substantially conventional design, and disposed in direct exposure to the sun's radiant energy. Conduit means leading between the heat absorbing coil means and the heat transfer coil means is structured along with the coil means themselves to maintain a continuous flow of heated fluid therein. Proper fluid driving means in the form of a pump or the like serves to circulate or drive the heating fluid in substantially continuous circulation through both of the coils.

In that a continuous supply of heated fluid is constantly transferred to the heat transfer coil means from the heat absorbing coil means, a path of air flow traveling over the former and in contact therewith is continuously heated as it passes into the casing. As set forth above, clothes disposed within the casing are then dried by exposure to the heated air in the conventional fashion.

While the above structure effectively eliminates prolonged use of conventional drying facilities such as electrical coil, gas heat, etc., such conventional facilities may also be incorporated as an auxiliary heating source during periods when the solar collector portion of the system is not exposed to prolonged periods of the sun's radiation.

In addition, a heated fluid storage means in the form of a storage tank, which may be insulated, may be made a part of the path of heated fluid flow for prolonged use of the dryer assembly in the evenings, when the collector plate facilities cannot be exposed to the sun's radiant energy.

BRIEF DESCRIPTION OF THE DRAWINGS

For a fuller understanding of the nature of the present invention, reference is had to the following detailed description taken in connection with the accompanying drawings in which:

FIG. 1 is an isometric view of a clothes dryer housing and solar collector assembly defining at least in part a path of heated fluid flow through the collector assembly.

FIG. 2 is a sectional view showing structural components of the present invention.

Like reference numerals refer to like parts throughout the several views of the drawings.

DETAILED DESCRIPTION OF THE PREFERRED EMBODIMENT

Figure 3:
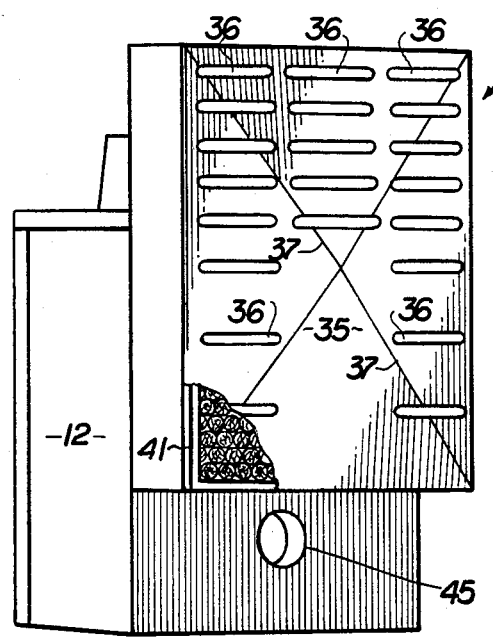
FIG. 3 is a perspective view of the rear of the assembly including an air flow casing and entrance cover plate therefor and filter in partial cutaway.

With reference to FIG. 1, a clothes dryer assembly is generally indicated as 10 and includes an exterior housing 12 with control panel 14 having mounted thereon a plurality of individual control surfaces or assemblies 15, 16 and 17. More specifically, control surface 15 may be representative of a standard timer disposed on conventional clothes dryer assemblies. Control surface 16 may be representative of an automatic timing device for timing and/or determining length of cycle of the solar portion of the dryer stage. Control surface 17 may be representative of a selective switch determinative of whether conventional electric energy is to be used to heat the clothes for drying or alternately solar energy. Such a selective switch structure can be selectively turned between electric energy and solar energy as desired by the user, dependent upon weather conditions. A door 18 is openable in conventional fashion to provide access to the interior 20 of a rotatable or tumbler type casing 22. The casing is rotatable relative to a fixedly mounted base or support plate 23 shown in detail in FIGS. 2 and 4. An air inlet means 24 is disposed in direct communicating relation with an air flow casing generally indicated as 26 to be described in greater detail hereinafter. Further, with reference to FIG. 4, an auxiliary air inlet 27 is provided in direct communication with the interior 20 of casing 22 so as to provide heated air from an auxiliary, substantially conventional source such as an electric heating element or the like (not shown). When the solar heating system is operable, a magnetically applied cover plate 28 is secured in covering relation about the auxiliary air inlet 27 to prevent undue venting or escape of the heated air from the interior of the casing 20 so that heated air will be maintained therein and for prolonged exposure to the clothes being dried.

Figure 4:
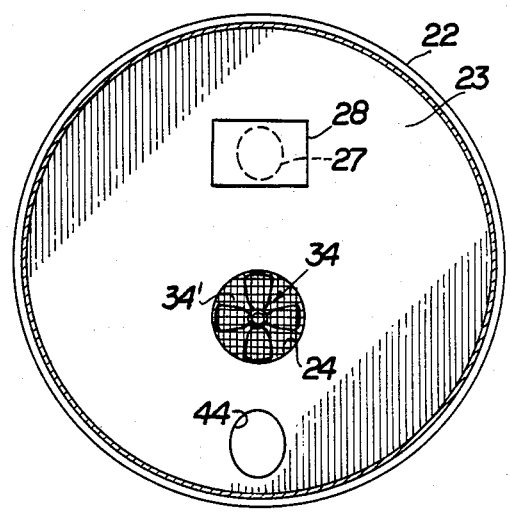
FIG. 4 is a front plan view taken along line 4—4 of FIG. 2 showing a base or mounting plate and venting means to and from the casing respectively.

Further with regard to FIG. 4, damper 28 may be magnetically or otherwise secured over the auxiliary air inlet 27 in that the base plate 23 of the casing 22 is formed from a metallic or like material and is fixed relative to the rotation of the casing 22. Similarly, when heated air enters casing 22 from auxiliary inlet 27, damper 28 may be repositioned therefrom into covering relation over air inlet 24 to prevent heated air inadvertently venting therethrough. It should be noted that the structure of the damper 28 is representative only and the overall configuration of the damper 28 may in fact differ since the overall configurations and/or sizes of the air inlet 24 and auxiliary air inlet 27 may in fact differ. However, only one damper can and should be covered at a time to prevent leakage of excess air from the interior 20 of casing 22. The inlet (24, 27) not covered will be the only supply of heated air entering interior 20 of casing 22.

It should be noted that for purposes of clarity, other structural details normally associated with a conventional clothes drying assembly such as motor and drive train for rotating the tumbler casing 22 and details of an auxiliary heater assembly are not shown since such construction is well known in the prior art and such components are readily mounted and/or positionable on a clothes drying assembly 10.

With reference to FIGS. 2 and 3, an air flow casing 26 is mounted on the rear 30 of the housing 12 to the extent that air inlet means 24 communicates with conduit 32 which serves to funnel air traveling along a defined path of air flow (see directional arrows in FIG. 2) at least partially defined on the interior of the air flow casing 26. An air drive means including a blower assembly generally indicated as 34, mounted adjacent or at the entrance of conduit 32, when activated serves to draw air in through air flow casing entrance means in the form of a facing plate 35 (FIG. 3). Facing plate 35 has a plurality of apertures 36 collectively arranged in a predetermined array so as to draw air from the exterior of the air flow casing 26 therethrough over heat transfer coil means generally indicated as 38. Further, facing plate 35 includes integrally formed diagonally oriented seams 37 which are added for strength and which are structured to cause a substantially outward bowing of facing plate 35. (See FIG. 2). This prevents inward bowing or bending of the face plate when air is forced therethrough. This heat transfer coil means 38 is disposed in interruptive, substantially transverse relation to the path of air flow and particularly in heat transferring relation to air passing into the apertures 36 over the heat transfer coil means 38, through conduit 32 and into the interior 20 of tumbler casing 22 through air inlet 24. As set forth above, the air flow is established upon activation of the blower assembly 34. As shown in both FIGS. 2 and 4, a protective screen element 34' is provided to prevent articles within casing 22 from coming in contact with and tangling in the blower assembly 34.

The heat transfer coil means 38 comprises a continuous coil portion 39 structured in a substantially circuitous configuration and further structured to maintain a selectively continuous flow of predetermined heated fluid therethrough in a somewhat conventional fashion. Further structural features of the heat transfer coil means 38 include a plurality of elongated fins 42 disposed in parallel, directly adjacent and spaced apart relation to one another and in engaging the coil portion 39 at various points along its length. Further, a filter means (FIGS. 2 and 3) 41 is disposed on the exterior surface and is dimensioned to effectively cover the entire exterior surface area of the facing plate 35. By virtue of this placement, all air passing through the individual apertures 36 and passing along the defined path of air flow into conduit 32 and air inlet 24 is filtered to prevent debris and dust from collecting between the fins and thereby clogging them and preventing air from passing therebetween which would decrease the efficiency of the heating coils. This placement also prevents undue debris or dust being directed onto the clothes being dried within the interior 20 of casing 22. Further, the coil means includes end plates 43 which are configured and structured to somewhat surround and at least partially encase the end portion or return portions as at 39' of the coil portion 39. This is to prevent or reduce escapement of the air passing along the air flow and insure maximum heat transferring relation between the overflowing air and the coil portion 39 and plurality of fins 42.

Once the heated air passes into air inlet 24 and performs a heating function on clothes or like materials maintained therein, it is properly vented, due to a positive air pressure within the interior 20 of casing 22 through a vent aperture or conduit 44. This vent 44 communicates directly with the base plate 23 and exits as at 45 to the exterior of the rear of the housing 12 (see FIGS. 2 and 3). Proper venting flow is further insured through the operation of a venting fan 47 which may be driven by electric motor 49. Further, electric motor 49 may also be interconnected as represented by output drive element 90 and drive element 91 drivingly attached to a driven belt member 92. This belt member 92 is secured about the casing exterior 22 such that operation of the motor 49 causes the rotation or tumbling action of the casing 22 in a manner well known in the art.

Figure 5:
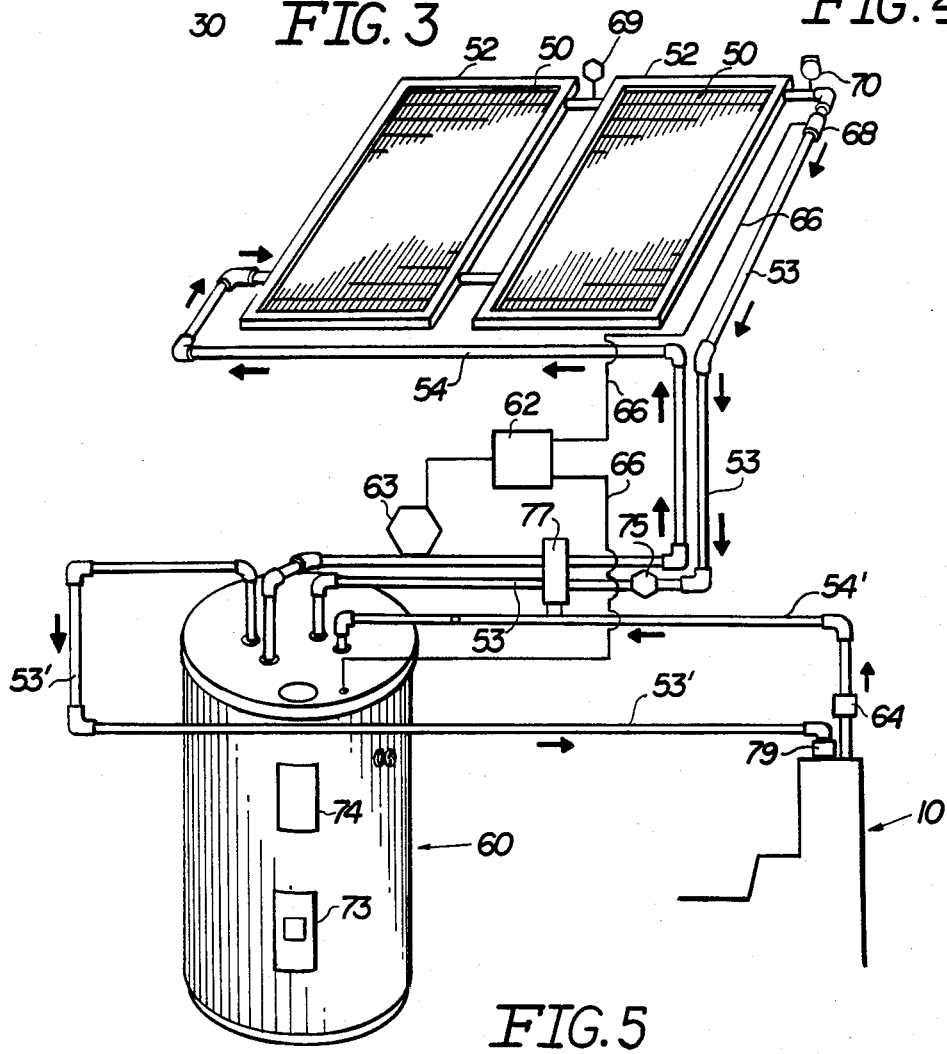
FIG. 5 shows a perspective representation partial schematic of a defined path of heated fluid flow from collector plates to a storage means to and from the clothes dryer housing.

With regard to FIGS. 1, 2 and 5 and as stated above, the air heating means comprises the heat transfer coil 38 located within the interior of the air flow casing 26. However, the fluid continuously flowing therethrough is heated by means of heat absorbing coils 50 structured to be part of collector plates 52 interconnected to one another and, along with the heat transferring coils 38 define, at least in part, a path of heated fluid flow. It should be noted that in the embodiments of FIGS. 1 and 5, two collector plates 52 are shown mounted substantially remote from the clothes dryer assembly 10 but in communication therewith by primary conduit means 53 and 54. This conduit means channel the heated fluid from the collector plates 52 to the heat transfer coil means 38 and therefrom back to the collector plates 52 for reheating respectively. While two collector plates 52 are shown, it should be apparent that any number of collector plates may be utilized in order to efficiently obtain sufficient heat and/or the storage of heated fluid through a storage means or tank generally indicated as 60 to be described in detail hereinafter. Accordingly, in the embodiment of FIG. 1, the conduit means 53 and 54 as well as the heat transfer coil means 38 and heat absorbing coil means 50 of collector plates 52 define a substantially closed path of heated fluid flow. A continuous supply of heated fluid is thereby provided to the coil portion 39 and in heat transferring relation to air passing thereover as it travels through the air flow casing 26 and along the path of air flow at least partially defined thereby.

With regard to FIG. 5, a control system is utilized to activate and/or control and selectively maintain continuous flow of heated fluid through the conduits 53 and 54 and the aforementioned heat absorbing and heat transfer coils 50 and 38 respectively. The control means and/or additional conduit structure serves to transfer heated fluid from the collector plates 52 into and through the fluid storage means or storage tank 60. Such control means may include an overall control circuitry 62 interconnected to a primary driving pump 63. An auxiliary pump 64 serves to direct fluid, upon activation, from the storage means 60 through auxiliary conduit means 53' into the heat transfer coil means 38 of the clothes drying assembly 10. Electrical conductor means serves to interconnect the various components of the control circuitry and assembly wherein such conductor means 66 extends from the main control assembly 62 to a sensor assembly 68; further wherein a pressure relief valve 69 and venting structure 70 is also disposed in direct fluid sensing relation as also shown in FIG. 5. Other structural features include tank sensing means 73 and a backup electric heating element 74. Other valving arrangements include check valve 75 and automatic drain down valves 77 in case of excess pressure. A pressure check valve 79 is shown as indicated to check internal pressures of the heated liquid or fluid before it enters the coil and/or effectively checks the first or hotter side of the coil bank itself.

Although the invention as shown in the embodiment of FIG. 5 includes a venting valve 69, inserted for safety, it should be noted that the system does not lose excessive fluid therethrough. To the contrary, based on the concept of thermal syphoning the liquid, when heated, is caused to expand and is set in continuous motion throughout the system. Excess liquid caused by its expansion is eventually transferred to the storage tank 60 or a like facility serving as a holding tank or structure. It is of course obvious that the storage tank 60 may assume a variety of structural configurations and, as set forth above, inherently may serve as a holding facility to receive the expanded liquid when the liquid within the system reaches a high temperature such as on extremely hot days or when the clothes drying assembly 10 is not used for extended periods. The expansion of the liquid within the system causes the above noted constant motion throughout the system and is accommodated by the storage tank 60 serving as a holding tank or facility.

Further structural features of the present invention are best shown in FIG. 2 and include the provision of an auxiliary heating assembly generally indicated as 80. This heating assembly may be in the form of an electric resistance heater, etc. and is primarily provided so as to direct heated air into the interior 20 of casing 22 for drying clothes therein when the solar system of the present invention is not in use. It should be noted that the structure herein represented as 80 is representative only and provided in partial schematic.

It is therefore to be understood that the following claims are intended to cover all of the generic and specific features of the invention herein described, and all statements of the scope of the invention which as a matter of language, might be said to fall therebetween.

Now that the invention has been described, what is claimed is:

1. A solar drying assembly of the type primarily designed to dry clothes and like articles by exposure to heated air, said drying assembly comprising:
    (a) a dryer housing including a casing having a hollow interior dimensioned and structured to maintain clothes therein, air inlet means formed in said casing and disposed in communicating relation to a supply of heated air,
    (b) an air flow casing structured to at least partially define a path of air flow disposed in direct fluid communicating relation with said casing hollow interior,
    (c) an air flow casing entrance means disposed within said path of air flow and comprising a cover means for defining an exterior face of said air flow casing, said cover means including an apertured construction and being disposed and dimensioned to allow a quantity of air flow to pass therethrough,
    (d) air heater means including a heat transferring coil means mounted in said air flow casing downstream of said cover means and structured to house a substantially continuous flow of heated fluid therein, said heat transferring coil means disposed in heat transferring, substantially interruptive relation to air passing along said path of air flow,
    (e) air driving means disposed in fluid communication with said air flow casing and at least partially defining said path of air flow through said casing and said air flow casing entrance means,
    (f) solar energy collector means disposed in direct exposure to radiant energy from the sun and including heat absorbing coil means structured to house a substantially continuous flow of heated fluid therein,
    (g) said heat absorbing coil means disposed in direct fluid communication with said transferring coil means, the latter two coil means at least partially defining along with a fluid driving means, a path of heated fluid flow,
    (h) said path of heated fluid flow structured and disposed to direct a substantially continuous flow of heated fluid in heat transferring relation to air passing along said path of air flow into said casing means,
    (i) whereby clothes within said casing are dried by exposure to heated air passing into said casing.

2. An assembly as in claim 1 wherein said apertured construction comprises a plurality of apertures integrally formed in said cover means in a predetermined array, said cover means further comprising a cover plate including a substantially outwardly bowed configuration including a plurality of seam means for strengthening said cover plate and being integrally formed in said cover plate and extending substantially from a peripheral portion thereof inwardly toward a substantially middle, central portion thereof in angled relation to one another.

3. An assembly as in claim 1 further comprising air filter means mounted on the exterior of said cover plate and configured and dimensioned to substantially cover said predetermined array of apertures formed within said cover plate.

4. An assembly as in claim 1 wherein said path of heated fluid flow further comprises conduit means interconnecting said heat absorbing coil means and said heat transfer coil means both upstream and downstream of the latter coil means respectively from and to the former coil means, a predetermined heated fluid composition maintained in continuous flow therebetween upon activation of said fluid driving means.

5. An assembly as in claim 1 wherein said heat absorbing coil means, said conduit means and said heat transfer coil means collectively define a closed circuit portion of said path of heated fluid flow, said predetermined heated fluid having an increased temperature of boiling and a decreased temperature of freezing relative to water.

6. An assembly as in claim 5 wherein said heat transfer coil means includes a substantially continuous elongated circuitous configuration extending over a major portion of the length of said air flow casing substantially transverse to a direction of air travel along said path of air flow.

7. An assembly as in claim 5 further comprising a plurality of fin elements each having an elongated configuration and secured to successive and substantially aligned portions of said heat transfer coil means at adjacent, spaced apart points along the length of each fin element.

8. An assembly as in claim 7 wherein each of said fin elements is disposed to include a longitudinal axis substantially transverse to and a width substantially aligned with the direction of travel of air passing along said path of air flow and in heat transferring relation thereto.

9. An assembly as in claim 8 wherein said path of heated fluid flow further comprises fluid storage means disposed downstream of said heat absorbing coil means and upstream of said heat transfer coil means and in fluid communication with both coil means, whereby said predetermined heated fluid is selectively forced from said fluid storage means to said heat transfer means and heat transferring relation to air traveling along said path of air flow.

10. An assembly as in claim 1 further comprising an auxiliary air heating means including an electrically powered resistance coil disposed in interruptive and heat transferring relation to a secondary path of air flow, said casing including a secondary air inlet means disposed independently of and separated from said air inlet means being interconnected in fluid communication with said heat transfer coil means.

11. An assembly as in claim 10 further comprising inlet cover means selectively positionable over one of said two air inlet means and auxiliary air inlet means, whereby heated air entering the casing is prevented from being vented exteriorly thereof through the other of said inlet means.

12. A solar drying assembly of the type primarily designed to dry clothes and like articles by exposure to heated air, said drying assembly comprising:
(a) a dryer housing including a casing having a hollow interior dimensioned and structured to maintain clothes therein, air inlet means formed in said casing and disposed in communicating relation to a supply of heated air,
(b) an air flow casing structured to at least partially define a path of air flow disposed in direct fluid communicating relation with said casing hollow interior,
(c) air heater means including a heat transferring coil means mounted in said air flow casing and structured to house a substantially continuous flow of heated fluid therein, said heat transferring coil means disposed in heat transferring, substantially interruptive relation to air passing along said path of air flow,
(d) air driving means disposed in fluid communication with said air flow casing and at least partially defining said path of air flow therethrough,
(e) solar energy collector means disposed in direct exposure to radiant energy from the sun and including heat absorbing coil means and structured to house a substantially continuous flow of heated fluid therein,
(f) said heat absorbing coil means disposed in direct fluid communication with said heat transferring coil means, said latter two coil means at least partially defining along with a fluid driving means, a path of heated fluid flow,
(g) said path of heated fluid flow structured and disposed to direct a substantially continuous flow of heated fluid in heat transferring relation to air passing along said path of air flow and into said casing means,
(h) an auxiliary air heating means including an electrically powered resistance coil disposed in interruptive and heat transferring relation to air entering said casing from said air flow casing,
(i) whereby clothes within said casing are dried by exposure to heated air passing into said casing.

13. An assembly as in claim 12 wherein said auxiliary air heating means further includes a secondary path of air flow, said resistance coil disposed in interruptive and heat transferring relation to air passing along said secondary path of air flow, said casing including a secondary air inlet means disposed independently of and separated from said air inlet means.

14. An assembly as in claim 13 further comprising inlet cover means selectively positionable over one of said two air inlet means and auxiliary air inlet means, whereby heated air entering the casing is prevented from being vented exteriorly thereof through the other of said inlet means.

* * * * *